US012643773B2

(12) United States Patent
Freyer

(10) Patent No.: US 12,643,773 B2
(45) Date of Patent: Jun. 2, 2026

(54) TELESCOPIC STRUT FOR A DEVICE FOR LIFTING LOADS

(71) Applicant: Siemens Aktiengesellschaft, Munich (DE)

(72) Inventor: Hans Otto Freyer, Hanau (DE)

(73) Assignee: Siemens Aktiengesellschaft, Munich (DE)

( * ) Notice: Subject to any disclaimer, the term of this patent is extended or adjusted under 35 U.S.C. 154(b) by 488 days.

(21) Appl. No.: 17/925,875

(22) PCT Filed: May 20, 2021

(86) PCT No.: PCT/EP2021/063405
§ 371 (c)(1),
(2) Date: Nov. 17, 2022

(87) PCT Pub. No.: WO2021/234066
PCT Pub. Date: Nov. 25, 2021

(65) Prior Publication Data
US 2023/0192454 A1 Jun. 22, 2023

(30) Foreign Application Priority Data
May 20, 2020 (DE) ......................... 202020002227.6

(51) Int. Cl.
*B66C 23/70* (2006.01)
*F16C 29/02* (2006.01)

(52) U.S. Cl.
CPC .......... *B66C 23/707* (2013.01); *B66C 23/701* (2013.01); *F16C 29/02* (2013.01)

(58) Field of Classification Search
CPC .. F16C 3/03; F16C 3/035; F16C 29/02; B66C 23/701; B66C 23/702; B66C 23/703;
(Continued)

(56) References Cited

U.S. PATENT DOCUMENTS 3,537,762 A * 11/1970 Lodige ................... F16C 29/12
384/42
3,809,249 A * 5/1974 Grove ................... B66C 23/707
212/350
(Continued)

FOREIGN PATENT DOCUMENTS

DE 102004045516 4/2006
EP 1982948 10/2008
(Continued)

OTHER PUBLICATIONS

PCT International Search Report dated Sep. 2, 2021 based on PCT/EP2021/063405 filed May 20, 2021.

*Primary Examiner* — Jonathan Liu
*Assistant Examiner* — Guang H Guan
(74) *Attorney, Agent, or Firm* — Cozen O'Connor

(57) ABSTRACT

A telescopic strut, in particular for a device for lifting loads, in particular for a hanger for vehicles or vehicle parts, wherein the telescopic strut consists of an outer tube and an inner tube guided therein, wherein the inner tube is movable longitudinal direction in the outer tube, where a number of sliding shoes are attached to the outer tube to guide the inner tube, where the sliding shoes have each been introduced from the outside into an opening in the wall of the outer tube and protrude inwardly to guide the inner tube such that the telescopic strut, which is structurally simple and therefore inexpensive to produce, has good sliding properties, has little guide play and is easy to maintain.

9 Claims, 5 Drawing Sheets

(58) Field of Classification Search
  CPC ... B66C 23/705; B66C 23/706; B66C 23/707;
                                                B66C 23/708
  See application file for complete search history.

(56) References Cited

U.S. PATENT DOCUMENTS

| | | | | |
|---|---|---|---|---|
| 3,866,899 | A * | 2/1975 | Lee ........................ | A61G 13/06 |
| | | | | 5/611 |
| 4,004,695 | A * | 1/1977 | Hockensmith ........ | B66C 23/701 |
| | | | | 52/118 |
| 4,260,105 | A * | 4/1981 | Phillips .................... | E01B 9/10 |
| | | | | 238/306 |
| 5,758,785 | A * | 6/1998 | Spinosa ................. | B66C 23/68 |
| | | | | 212/300 |
| 7,357,376 | B2 * | 4/2008 | Assmann ................ | B66C 13/06 |
| | | | | 254/337 |
| 9,950,911 | B2 * | 4/2018 | Fortunato ............... | F16C 29/02 |
| 11,041,526 | B1 * | 6/2021 | Calago .................... | F16C 29/02 |
| 12,510,117 | B2 * | 12/2025 | Sheehan ................. | F16C 29/02 |
| 2006/0219650 | A1 * | 10/2006 | Gokita ................. | B66C 23/707 |
| | | | | 212/350 |
| 2013/0087679 | A1 * | 4/2013 | Mooney ................. | B66C 23/32 |
| | | | | 414/800 |
| 2023/0192454 | A1 * | 6/2023 | Freyer .................... | B66C 13/06 |
| | | | | 212/273 |

FOREIGN PATENT DOCUMENTS

| | | |
|---|---|---|
| FR | 2759687 | 8/1998 |
| IT | MO20120019 | 7/2013 |
| JP | H0636050 Y2 * | 9/1994 |
| RU | 2137701 C1 | 9/1999 |
| WO | 2014191561 | 12/2014 |

* cited by examiner

TELESCOPIC STRUT FOR A DEVICE FOR LIFTING LOADS

CROSS-REFERENCE TO RELATED APPLICATIONS

This is a U.S. national stage of application No. PCT/EP2021/063405 filed 20 May 2021. Priority is claimed on German Application No. 20 2020 002 227.6 filed 20 May 2020, the content of which is incorporated herein by reference in its entirety.

BACKGROUND OF THE INVENTION

1. Field of the Invention

The invention relates to a telescopic strut for a stabilizer for a device for lifting loads, in particular for a hanger for vehicles or vehicle parts.

2. Description of the Related Art

In order to stabilize conveying assemblies for lifting and lowering loads (so-called lifting mechanisms or "hangers"), use is often made of telescopic struts (referred to for short as telescopes). Here, an inner tube, which is moved in an outer tube, is retracted or extended during the lifting or lowering movement.

DE 10 2004 045 516 A1—Aßmann, "Vorrichtung zum Heben and Stabilisieren von Lasten" ["Device for lifting and stabilizing loads"] discloses telescopic struts of for stabilization in a device for lifting loads.

IT MO 20120019A1—Cosben, "Braccio Telescopico" ["Telescopic arm"] discloses the outer section of a telescopic arm of a crane with multi-part guide elements on the outer tube, which have a screw-based adjuster between a sliding piece and an upper part.

WO 2014/191561 A1 and EP 1 982 948 A2 disclose telescopic sections of a crane with such a design.

FR 2 759 687 A1 discloses guide elements inserted at an end side into an outer section of a telescopic crane arm.

Telescopes used for stabilizing conveying assemblies for lifting and lowering loads have hitherto been implemented with guide rollers. Here, the movement of the inner tube in the outer tube occurs via multiple, in part settable guide rollers. Here, the guide rollers are, for example, arranged horizontally and vertically on the outer tube of the telescope and serve for guiding the inner tube. Each guide roller is mounted rotatably in roller blocks, and these are in turn welded to the outer tube. The roller bearing arrangement is intended here to ensure as free and low-friction a movement as possible, and at the same time to guide the inner tube in the outer tube with the least possible clearance. This solution with rollers and bearings (for example, ball bearings) installed in the rollers is complex to manufacture and is therefore expensive. Furthermore, exchanging the rollers in the event of a defect or in the event of wear-induced damage is time-consuming and thus leads to long downtimes of the lifting mechanisms concerned. Moreover, in the case of the roller-based solution mentioned, the setting of the guide clearance of the telescopic struts is time-consuming.

SUMMARY OF THE INVENTION

In view of the foregoing, it is therefore an object of the present invention to provide a structurally simple, functional and low-maintenance configuration of telescopic struts.

A core concept of the solution in accordance with the invention to the problem is achieved by implementing the guidance of the inner tube in the outer tube of the telescopic strut using sliding shoes that are easy to manufacture. For the purposes of easy installation, the sliding shoes are plugged into corresponding openings in the outer tube from the outside, and guide the inner tube. The sliding shoes are preferably produced from a material with good sliding characteristics, for example plastic.

The foregoing and other objects and advantages are achieved in accordance with the invention by a telescopic strut, suitable for a stabilizer for a device for lifting loads, in particular for a hanger for vehicles or vehicle parts, where the telescopic strut is composed of an outer tube and of an inner tube guided in said outer tube, and where the inner tube is movable in a longitudinal direction in the outer tube. Here, a number of sliding shoes are attached to the outer tube for the purposes of guiding the inner tube, where the sliding shoes have each been introduced from the outside into an opening in the wall of the outer tube and protrude inwardly for the purposes of guiding the inner tube. This solution, which is simple in configuration and is inexpensive to produce, has good sliding characteristics, has a small guide clearance, and is easy to set and maintain.

The inner tube is advantageously composed of a metallic material, and the sliding shoes are composed substantially of plastic. Sliding shoes composed of plastic have good running characteristics, and a low rate of wear, on metallic surfaces.

A small tilting clearance of the telescope is achieved if the sliding shoes are grouped into two spaced-apart regions (guide regions) of the outer tube and, in each of the regions, at least four of the sliding shoes are arranged so as to be distributed annularly around the periphery of the outer tube.

In one particularly advantageous embodiment, the outer tube and the inner tube each have a substantially rectangular cross section, where, in each of the regions, two sliding shoes are arranged adjacent to one another at each of the wide sides of the outer tube, and where one sliding shoe is arranged at each of the narrow sides.

The sliding shoes advantageously have a bevel at least in a sliding direction at the contact surface with respect to the inner tube. This not only improves the running characteristics but also makes it easier for the outer tube equipped with sliding shoes to be assembled with the inner tube, such as after a disassembly operation.

In accordance with the invention, the sliding shoes have a substantially T-shaped cross section, where the small-area part of the sliding shoe is led through the opening of the outer tube from the outside, and where an overhanging wide part of the sliding shoe, as a bearing surface, bears against the outer tube from the outside and is connected, in particular screwed, to the outer tube in the region of the bearing surface. The sliding shoes can thus be installed or exchanged at any time, even when the inner tube has already been pushed into the outer tube. Furthermore, it is thus possible for the guide clearance to be set from the outside. For this purpose, in accordance with the invention, a spacer is introduced in each case between the outer side of the outer tube and the bearing surface of the sliding shoe, where, depending on the thickness or number of the spacers, the sliding shoe projects to a greater or lesser depth into the interior cross section of the outer tube, and can thus be exactly adapted to the dimensions (for example, width) of the inner tube. Here, the spacer is exchangeable for the purposes of setting a guide clearance of the telescopic strut and/or for the purposes of compensating for wear of the sliding block. Alternatively, setting screws, in particular grub screws, may be provided in additional threaded holes of the sliding shoes in the bearing region for the purposes of setting the penetration depth.

As a spacer, a metal sheet or a plastics plate is advantageously provided which, in one advantageous embodiment, is pushed in under the bearing surface of the sliding shoe from the side. The spacer is advantageously screwed to the sliding piece and to the outer tube, where, in a particularly advantageous embodiment, one and the same screws both fasten the sliding shoe to the wall of the outer tube and fix the spacer (distancing plate, "shim"). For this purpose, the spacer and the sliding shoe advantageously have identical bores or a corresponding bore pattern, where the screws used for fastening the sliding shoe to the outer tube are led through the bores of the spacer. In one embodiment, the spacer has no bores but has U-shaped cutouts, which are open to an outer edge, for the screws such that, even when the screws have already been installed, the spacer can be pushed in laterally under the bearing surface of the loosened sliding shoe. For the purposes of fixing, the spacer is then advantageously clamped between the bearing surface of the sliding shoe and the outer tube.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the telescopic strut according to the invention will be discussed below on the basis of the drawings, in which.

DETAILED DESCRIPTION OF THE EXEMPLARY EMBODIMENTS

Figure 1:
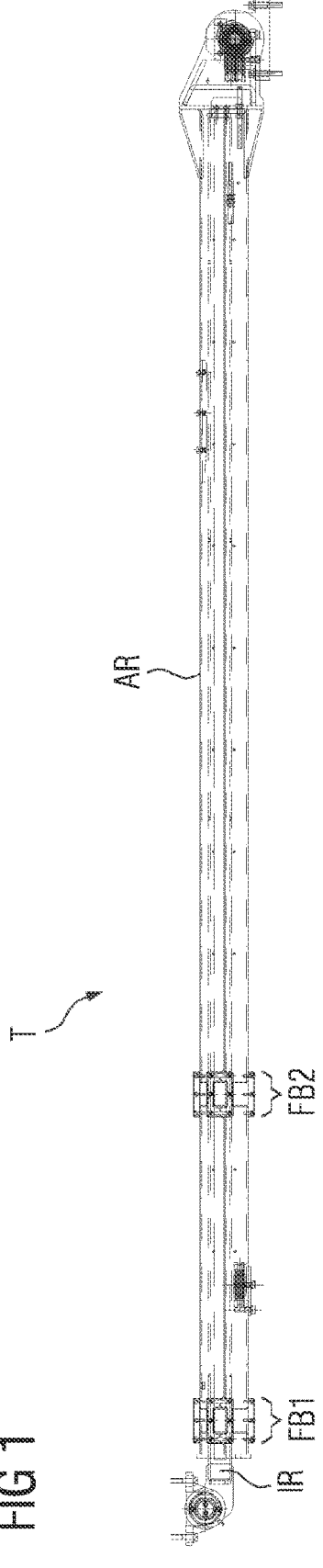
FIG. 1 shows a sectional illustration of a telescopic strut in accordance with the invention.

FIG. 1 shows a multi-sectional illustration of a telescopic strut T ("telescope") in accordance with the invention having an outer tube AR and an inner tube IR, where sliding shoes are arranged annularly around the outer periphery of the outer tube AR in two guide regions FB1, FB2. The guide regions FB1, FB2 are spaced apart from one another to a certain extent to prevent tilting of the inner tube IR in the outer tube AR. At the same time, however, both guide regions FB1, FB2 are arranged close enough to the open end of the outer tube AR such that, even when the inner tube IR has been almost fully extended, the inner tube is guided in both guide regions FB1, FB2, and reliable, tilting-free guidance thus continues to be ensured.

Figure 2:
FIG. 2 shows two perspective illustrations (bottom side, top side) of the telescopic strut of FIG. 1.

FIG. 2 shows the telescopic strut in accordance with the invention in a perspective view, on the one hand from a first, upper side, and on the other hand from a second, lower side. The reference designations already introduced in FIG. 1 also apply to FIG. 2 and to all subsequent figures. In addition to the illustration from FIG. 1, FIG. 2 illustrates the sliding shoes G, which are fastened in the wall of the outer tube AR from the outside via in each case 6 screws. By contrast to FIG. 1, in which the inner tube IR has been pushed into the outer tube AR from the left-hand side in the illustration, it is the case in FIG. 2 that the inner tube IR has been pushed into the right-hand end of the outer tube AR. Correspondingly, in FIG. 2, the guide regions FB1, FB2 with the sliding shoes G are situated at the right-hand, open end of the outer tube AR.

Figure 3:
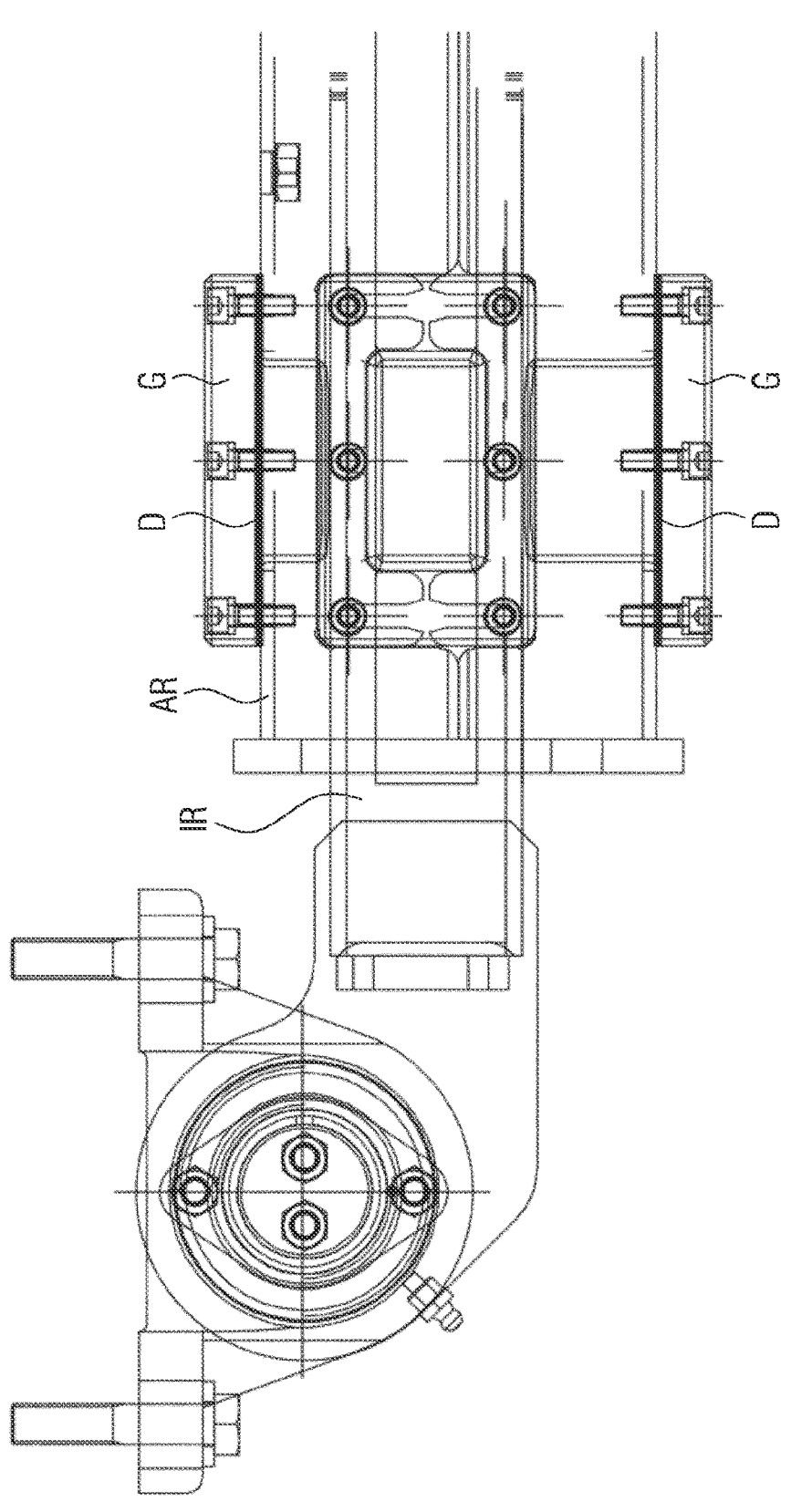
FIG. 3 shows a detail illustration of a region with three sliding shoes in accordance with the invention.

FIG. 3 shows a detail illustration of the installed sliding shoes G in the vicinity of the open end of the outer tube AR. Here, it is possible to see the substantially T-shaped cross section of the sliding shoes G, where the 6 screws via which the sliding shoe G is fastened are screwed into an overhanging region that bears against the outer tube AR from the outside, and where an integrally formed relatively small, cylindrical or rectangular part of the sliding shoe G projects through a corresponding opening of the outer tube AR in each case into the interior region of the outer tube AR and, via the bottom side, guides the inner tube IR. FIG. 3 also shows spacers D (distancing plates, "shims") which, via their thickness, each define the depth to which the sliding shoe G penetrates into the interior region of the outer tube AR.

Figure 4:
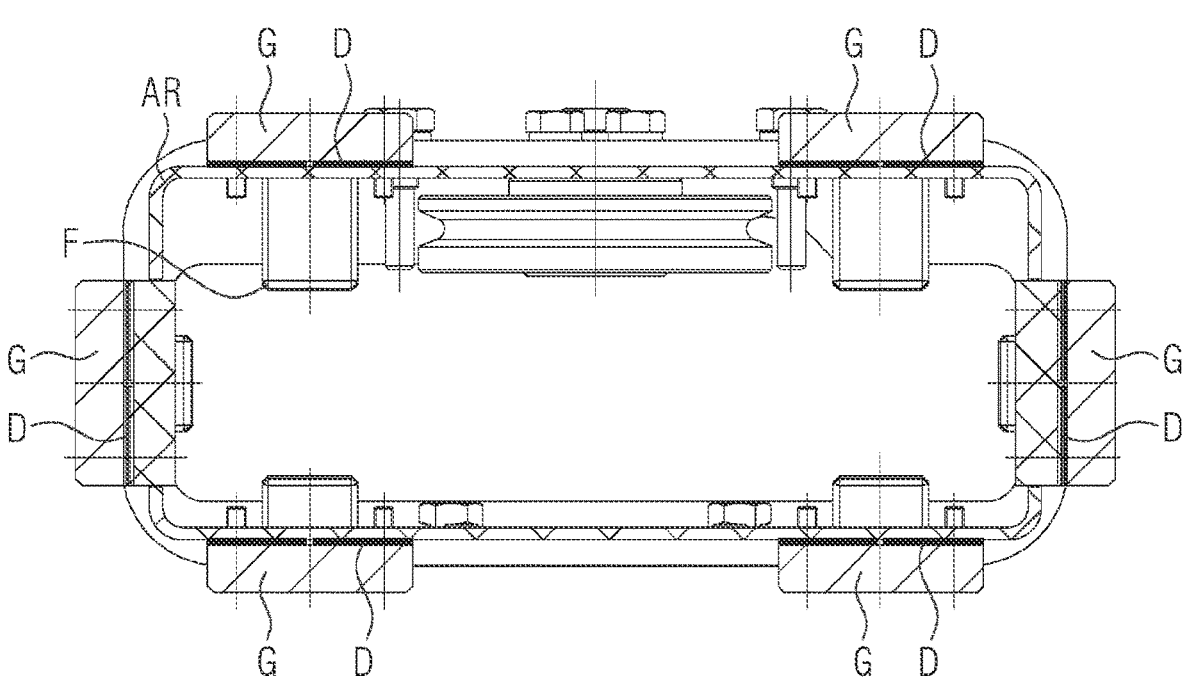
FIG. 4 shows a cross-sectional illustration of the outer tube with installed sliding shoes in accordance with the invention.

FIG. 4 shows a cross-sectional illustration, transversely with respect to the longitudinal direction of the outer tube AR, in the region of the installed sliding shoes G. The inner tube is not illustrated in this illustration. It can be seen here that the sliding shoes G are encirclingly beveled, in the region of their sliding surface, with a bevel F. Otherwise, the guide surfaces of the sliding shoes G, i.e., the contact surfaces with respect to the inner tube IR, are substantially smooth in this exemplary embodiment. In other embodiments, in which a (preferably PTFE-based) lubricant is additionally used, the sliding surface may also have a texture, in the depressions of which the lubricant can adhere.

Figure 5:
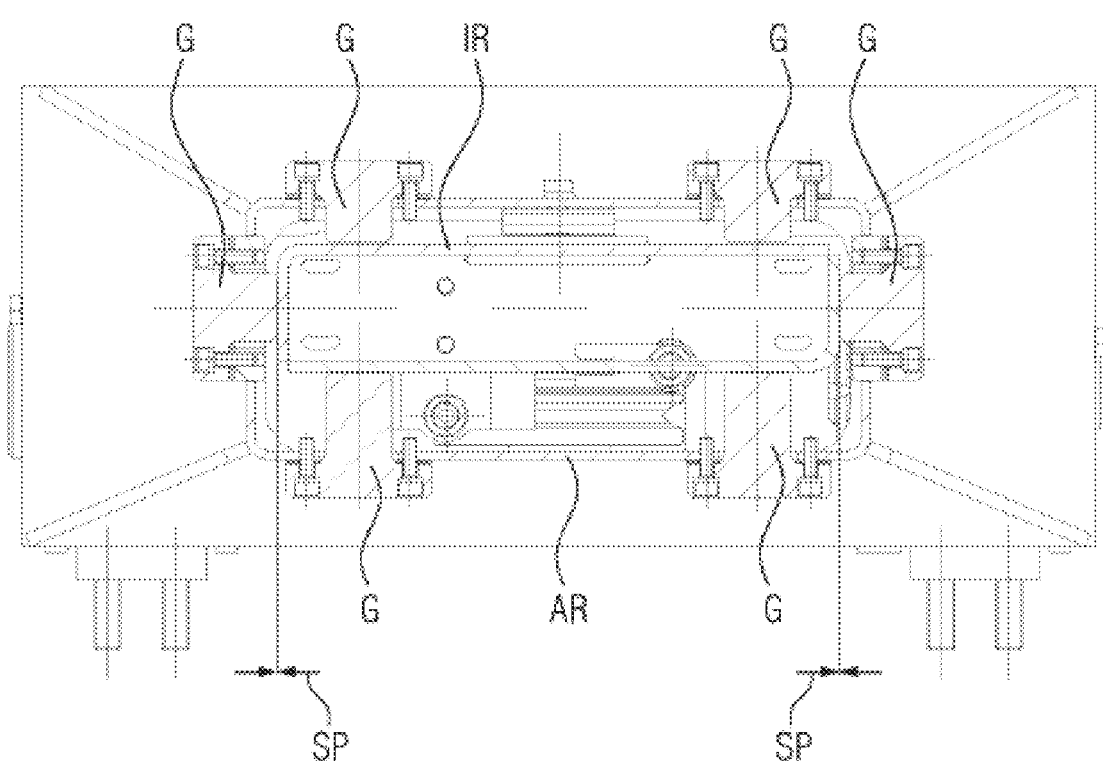
FIG. 5 shows a cross-sectional illustration of the outer tube with installed sliding shoes and the inner tube in accordance with the invention.

FIG. 5 likewise shows a cross-sectional illustration of the outer tube AR in the region of six installed sliding shoes G, with the inner tube IR also being illustrated in this illustration. A guide clearance SP (clearance) is indicated at the sliding shoes G of the narrow sides of the outer tube AR. The guide clearance is set by virtue of spacers D of greater or lesser thickness being introduced to shim the bearing surfaces of the outer tube AR in the region of the contact surfaces of the sliding shoe G.

A plastic, in particular based on a pure, ultra-high-molecular-weight, low-pressure polyethylene, has proven successful as a material for the sliding shoes in interaction with an inner tube IR composed of metal.

The sliding shoes proposed here are easy to manufacture, for example, by cutting machining. By virtue of the fact that a roller configuration with roller blocks can be omitted, welding distortion of the outer tube during the production process is reduced. As a result, the outer tube can be manufactured more exactly and is less expensive to produce. The configuration proposed here has the effect that the sliding shoes can be easily set or adjusted and can also be easily exchanged.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A telescopic strut for a stabilizer for a device for lifting loads, the telescopic strut comprising:

an outer tube;

an inner tube guided in the outer tube, the inner tube being movable in a longitudinal direction in the outer tube;

a plurality of sliding shoes attached to the outer tube for guiding the inner tube, each sliding shoe of the plurality of sliding shoes being introduced from an outside into a respective opening of a plurality of openings in a wall of the outer tube and protruding inwardly for guiding the inner tube; and a plurality of spacers, each spacer of the plurality of spacers being introduced between an outer side of the outer tube and a bearing surface of a respective sliding shoe of the plurality of sliding shoes;

wherein the plurality of sliding shoes each have a substantially T-shaped cross section, wherein a part of each sliding shoe of the plurality of sliding shoes is led through the respective opening of the plurality of openings in the wall of the outer tube from the outside, wherein an overhanging part of each sliding shoe of the plurality of sliding shoes forms the bearing surface of the sliding shoe, bears against a respective spacer of the plurality of spacers bearing against the outer tube, and is connected in a screwed manner to the outer tube in a region of the bearing surface of the sliding shoe, wherein two groups of the plurality of sliding shoes are arranged at two spaced-apart regions of the outer tube respectively, and wherein within each of the two spaced-apart regions, at least four sliding shoes of the two groups of the plurality of sliding shoes are arranged in an annularly distributed manner around a periphery of the outer tube, only one sliding shoe of the two groups of the plurality of sliding shoes is arranged at a first lateral side of the outer tube, only one sliding shoe of the two groups of the plurality of sliding shoes is arranged at a second lateral side of the outer tube, two sliding shoes of the two groups of the plurality of sliding shoes arranged at a first transverse side of the outer tube extend a first depth into the outer tube, and two sliding shoes of the two groups of the plurality of sliding shoes arranged at a second transverse side of the outer tube extend a second depth into the outer tube, the second depth being different from the first depth.

2. The telescopic strut as claimed in claim 1, wherein the inner tube is composed of a metallic material and each sliding shoe of the plurality of sliding shoes is composed substantially of plastic.

3. The telescopic strut as claimed in claim 1, wherein the outer tube and the inner tube each have a substantially rectangular cross section.

4. The telescopic strut as claimed in claim 1, wherein each sliding shoe of the plurality of sliding shoes has a bevel arranged at a distal end of the sliding shoe in a region of a sliding surface of the sliding shoe.

5. The telescopic strut as claimed in claim 1, wherein each spacer of the plurality of sliding shoes is exchangeable so as to at least one of (i) set a guide clearance of the telescopic strut or (ii) compensate for wear of the sliding shoe.

6. The telescopic strut as claimed in claim 1, wherein each spacer of the plurality of spacers comprises a metal sheet or a plastic plate.

7. The telescopic strut as claimed in claim 1, wherein each spacer of the plurality of spacers is screwed to the respective sliding shoe of the plurality of sliding shoes and the outer tube.

8. The telescopic strut as claimed in claim 7, wherein each spacer of the plurality of spacers comprises a plurality of bores, which are congruent with a plurality of bores of the respective sliding shoe of the plurality of sliding shoes and are extended through by a plurality of screws used for fastening the respective sliding shoe of the plurality of sliding shoes to the outer tube.

9. The telescopic strut as claimed in claim 1, wherein each spacer of the plurality of spacers is clamped between the bearing surface of the respective sliding shoe of the plurality of sliding shoes and the outer tube.

* * * * *